Patented Aug. 16, 1938

2,127,451

UNITED STATES PATENT OFFICE 2,127,451

HARDENING AND WATERPROOFING COMPOSITION FOR CONCRETE OR MORTAR

Edward W. Scripture, Jr., Shaker Heights, Ohio, assignor to The Master Builders Company, Cleveland, Ohio, a corporation of Ohio No Drawing. Application January 17, 1936, Serial No. 59,603

13 Claims. (Cl. 106—27)

This invention relates to the hardening and waterproofing of concrete or mortar and has for its object to provide an indurating composition which will increase the strength, hardness and waterproofing qualities of concrete, and which will also improve the workability of a concrete mix.

In my co-pending application Serial No. 751,747, filed November 6, 1934, I have disclosed various hydraulic cement compositions containing plasticizing ingredients including waste sulphite liquor. The present invention provides a composition in a more convenient and more economical form capable of effecting similar results.

It is well known that in concrete made from locally available materials there is frequently a deficiency of fines in the sand so that the most desirable granulometric composition is not secured. Even with a sand which is not deficient in fines it is often advantageous to add to concrete a small proportion of fine material, finer than the usual cement, as this promotes greater density and watertightness by filling and making smaller the capillaries which form in the concrete. A disadvantage, however, which has hitherto accompanied such an addition of fines is that, to secure the same slump, flow or mobility of the concrete it has been necessary to add more water with the fines than would be required in a similar concrete mix without the fines. This has the disadvantage of decreasing the density, watertightness and strength and of increasing volume change. It is also known that a deficiency of fines may be made up by the addition of extra cement. This also involves the addition of more water, increases volume change, and also increases the heat evolved during hardening. In addition, by increasing the proportion of cement in the concrete the most soluble portion of the concrete is increased so that the concrete is more susceptible to corrosive attack. By the addition of an inert, insoluble material as fine as or finer than cement, the disadvantages of adding extra cement are overcome. By combining with this fine material a dispersing agent the disadvantage involved in the use of more water in the concrete mix with the fine material is avoided. Furthermore, the efficiency of the fine material is enhanced since its effect depends upon its fineness and its uniform mixing with the concerete and both of these are improved by the presence of a dispersing agent.

The addition of a fine pozzuolanic material has the advantages set forth above, and in addition combines with and fixes the free lime either originally present in the cement or formed by hydrolysis of the silicate compounds of the cement, rendering this lime less soluble, hence less subject to corrosive attack. The addition of such a fine pozzuolanic material entails the same disadvantage that exists in the addition of any other fine material, namely, the necessity for more water to secure mobility. The use of cement for this purpose is even less desirable than would be the case with an inert fine material since instead of diminishing the quantity of free lime in the concrete it will increase it. Here again the combination of a dispersing agent with the pozzuolanic material will overcome the necessity of more water in the concrete mix and, since the reactivity of a pozzuolanic material depends to a very considerable extent on its surface area, the dispersing agent will enhance its activity as well as facilitating its distribution in the mix.

It will be obvious that other materials may be added to the concrete at the same time as, for example, accelerators, waterproofings, colors or other materials. These may be added separately to the concrete mix at the time of mixing or might be added to the composition of fines and a dispersing agent prior to the mixing of the concrete. It will also be obvious that the composition of fines with dispersing agent may be added to the concrete when it is being mixed, or to each sack of cement before the mix is made, or to the cement when it is ground or, in fact, to any part of the concrete mix prior to the addition of the water.

A considerable number of chemical substances have been found effective for dispersing various finely divided solid materials in water. However, a dispersing agent effective for dispersing materials in one mixture may be relatively ineffective in another mixture. In the case of concrete mixes, a considerable number of substances which have been identified as dispersing agents for certain materials have been added to concrete mixes. Many of these substances, when present in a concrete mix, do not have sufficient dispersing action to appreciably affect the fluidity of the mix and others have distinctly deleterious effects on the concrete.

I have found that effective dispersion of fine materials in concrete mixes may be obtained by the addition of small quantities of waste sulphite liquor residue, and that such residue, when added to concrete mixes in sufficient proportions, very materially increases the workability of the mix and substantially reduces the amount of water required without deleterious effects on the concrete. The increase in fluidity of the concrete mix makes it possible to add substantial amounts of inert or pozzuolanic finely divided material without objectionably increasing the water content of the mix. The dispersing agent and fine materials are preferably prepared as a powder mixture to be added in suitable quantities to the ingredients of the concrete mix.

The composition of the present invention is formed by grinding together to a finely divided state the dried residue of waste sulfite liquors and an inert solid, finely divided material, such as precipitator dust, fly ash, talc, or the like, or a finely divided nonhydraulic pozzuolanic material, such as bauxite residue, pumice, diatomaceous earths, etc.

The term "inert" as used herein refers to finely divided solid materials which will not combine with lime to any appreciable extent.

An example of a suitable precipitator dust is the very fine dust collected in an electrical precipitator from fumes resulting from the combustion of powdered coal. Fly ash is the very fine ash resulting from the burning of powdered coal in a blast of air. Bauxite residue is the material which remains after the alumina has been extracted from bauxite.

By finely divided solids is meant any solid substantially insoluble in water of which all or substantially all will pass a 100 mesh sieve.

By pozzuolanic material is meant a substance which will take up lime from solution, either by chemical combination or adsorption, to form a relatively insoluble combination which has some cementitious value.

By "nonhydraulic" is meant a material which does not react with water alone to form cementitious compounds.

One example of a composition embodying the invention is the dry powder mixture obtained by grinding together dried sulfite liquor residue and precipitator dust in the proportion of one pound of dried waste sulfite liquor residue to twenty pounds of precipitator dust.

Tests show that the above composition when added to a cement mix reduces the amount of water required for the mix and materially increases the compressive strength. For example, the above composition was added to a standard 1 to 3 mortar mix in the proportion of 3% of the weight of the cement and the following compressive strengths were obtained:

3 days—1465 lbs. per square inch
7 days—2990 lbs. per square inch
28 days—4994 lbs. per square inch Tests of the same standard 1 to 3 mortar mix without the composition gave the following compressive strengths:

3 days—1369 lbs. per square inch
7 days—2831 lbs. per square inch
28 days—4739 lbs. per square inch In the mix containing the composition 440 c. c. of water were required for 1100 g. of cement. In the mix not containing the composition 500 c. c. of water was required for 1100 g. of cement.

A second example is the dry powder mixture obtained by grinding together dried waste sulfite liquor and bauxite residue in the proportions of one pound of dried waste sulfite liquor residue to 20 lbs. of bauxite residue.

Tests of a standard 1 to 3 mortar mix with the above composition added in the proportion of 3% by weight based on cement content gave the following results:

Water 430 c. c.—cement 1100 g.

*Compressive strengths*

After 3 days—2100 lbs. per sq. inch
After 7 days—3467 lbs. per sq. inch
After 28 days—4962 lbs. per sq. inch Tests of the same standard 1 to 3 mortar mix without the composition gave the following results:

Water 500 c. c.—cement 1100 g.

*Compressive strengths*

After 3 days—1433 lbs. per sq. inch
After 7 days—2608 lbs. per sq. inch
After 28 days—4134 lbs. per sq. inch For standard concrete and mortar mixes, the composition prepared as above described may be added to the cement or to the concrete mix at any time prior to the addition of the water in substantially the proportion of 3 lbs. of the powder composition per sack (94 lbs.) of cement.

It is to be understood that the proportion of the fines to the waste sulfite liquor residue may be varied as desired and that a mixture of inert and pozzuolanic materials may be employed, the proportions above given being convenient for practical use. The proportion of 3 lbs. per sack of cement is to be taken as an average figure, not as an exact specification. There can be a substantial variation in the proportion of the composition to the cement. Satisfactory results are obtained with as much as fifty per cent variation over or under the amount of waste sulfite liquor residue specified. With a decrease in proportion of more than fifty per cent the dispersing effect would be small. With an increase in proportion of more than 50% there might be a tendency to impair the strength of the concrete, but this will not be serious unless excessive quantities are used.

Where the aggregate lacks fines, a higher proportion of the composition can advantageously be used. In general, slag would require more, gravel the amount given, and crushed limestone less.

As far as richness or leanness of the mix is concerned, the regulation of proportions is taken care of by specifying on the basis of sacks of cement, more of the composition per cubic yard being used for a rich mix than for a lean mix. In this connection, however, it is true that, as far as the addition of inert fines is concerned, they are less necessary in a rich than in a lean mix, so that the proportion of fines to cement could be reduced, for example, to 2 lbs. per sack of cement, whereas in the leaner mixes the use of more, for example, 4 lbs. per sack of cement, would be advantageous. On the other hand, when pozzuolanic materials are used in the composition, the reverse is true, since these materials react with the cement and the richer mixes containing more cement require more pozzuolana.

The composition of the present invention is inexpensive and very effective in concrete mixes for the purposes described and this composition is provided in a form convenient for addition to concrete mixes.

Furthermore, it is to be understood that the particular compounds disclosed, and the procedure set forth, are presented for purposes of explanation and illustration and that various equivalents can be used and modifications of said procedure can be made without departing from my invention as defined in the appended claims.

What I claim is:

1. A mortar or concrete mix comprising hydraulic cement, aggregate, a finely divided non-hydraulic filling material, and finely divided waste sulphite liquor residue in such proportions that the waste sulphite liquor residue shall be present in the mix in the proportion of .05% to .3% by weight of the cement.

2. A mortar or concrete mix comprising hydraulic cement, aggregate, a finely divided non-hydraulic pozzuolanic material, and finely divided waste sulphite liquor residue in such proportions that the waste sulphite liquor residue shall be present in the mix in the proportion of .05% to .3% by weight of the cement.

3. As a new article of manufacture a dry cement having mixed therewith a finely divided non-hydraulic filling material and .05% to .3% by weight of finely divided waste sulphite liquor residue.

4. An indurating composition for concrete or mortar comprising a mixture containing a large proportion of finely divided non-hydraulic filling material and the constituents which form the residue of waste sulphite liquor in an amount less than half of one percent by weight of the cement.

5. An indurating composition for concrete comprising a mixture of finely divided non-hydraulic pozzuolanic material and the constituents which form the residue of waste sulphite liquor in an amount less than half of one percent by weight of the cement.

6. An indurating composition for inclusion in a cement or mortar mix comprising a mixture of finely divided non-hydraulic filling material and the constituents which form the residue of waste sulphite liquor, the latter being present in an amount such that it will provide the mix with waste sulphite liquor in an amount of .05% to .3% by weight of the cement.

7. An indurating composition for inclusion in a cement or mortar mix comprising a mixture of finely divided non-hydraulic pozzuolanic material and the constituents which form the residue of waste sulphite liquor, the latter being present in an amount such that it will provide the mix with waste sulphite liquor in an amount of .05% to .3% by weight of the cement.

8. An indurating composition for inclusion in a cement or mortar mix comprising a mixture of finely divided bauxite residue and the constituents which form the residue of waste sulphite liquor, the latter being present in an amount such that it will provide the mix with waste sulphite liquor in an amount of .05% to .3% by weight of the cement.

9. An indurating composition for inclusion in a cement or mortar mix comprising a mixture of finely divided precipitator dust and the constituents which form the residue of waste sulphite liquor, the latter being present in an amount such that it will provide the mix with waste sulphite liquor in an amount of .05% to .3% by weight of the cement.

10. As a new article of manufacture, a dry cement having mixed therewith a finely divided non-hydraulic pozzuolanic material and finely divided waste sulphite liquor residue, in the proportion of .05% to .3% by weight of the cement.

11. As a new article of manufacture, a dry cement having mixed therewith a finely divided precipitator dust and finely divided waste sulphite liquor residue, in the proportion of .05% to .3% by weight of the cement.

12. As a new article of manufacture, a dry cement having mixed therewith a finely divided bauxite residue and finely divided waste sulphite liquor residue, in the proportion of .05% to .3% by weight of the cement.

13. A mortar or concrete mix comprising hydraulic cement, aggregate, a finely divided non-hydraulic filling material, and the constituents which form the residue of waste sulphite liquor in an amount less than half of one percent by weight of the cement.

EDWARD W. SCRIPTURE, Jr.